United States Patent [19]
Ward

[11] Patent Number: 5,751,444
[45] Date of Patent: May 12, 1998

[54] IMAGING APPARATUS FOR COPYING BOUND DOCUMENTS

[75] Inventor: Michael J. Ward, San Jose, Calif.

[73] Assignee: Adobe Systems Incorporated, San Jose, Calif.

[21] Appl. No.: 573,732

[22] Filed: Dec. 18, 1995

[51] Int. Cl.⁶ ............................................ H04N 1/04
[52] U.S. Cl. ................................. 358/471; 358/474
[58] Field of Search ............................. 358/471, 492, 358/498, 473–474, 475; 250/208.1

[56] References Cited

U.S. PATENT DOCUMENTS

| | | | |
|---|---|---|---|
| 3,630,612 | 12/1971 | Lehovec | 350/96 B |
| 4,068,950 | 1/1978 | Kito | 355/75 |
| 4,486,655 | 12/1984 | Kataoka | 250/211 R |
| 4,633,080 | 12/1986 | Wilman et al. | 250/234 |
| 5,072,252 | 12/1991 | Howseman, Jr. | 355/1 |
| 5,475,505 | 12/1995 | Minasian et al. | 358/474 |

Primary Examiner—Edward L. Coles, Sr.
Assistant Examiner—Stephen Brinich
Attorney, Agent, or Firm—Fish & Richardson P.C.

[57] ABSTRACT

A portable apparatus for reproducing individual pages of a bound document without optical distortion or damage to the bound document, including a substantially flat sensor array which may be inserted between pages of a book. Sensors scan one or both opposed pages. Alternatively, the sensor array surfaces may be set at an angle, also creating a reproduction apparatus capable of insertion between pages of a bound document.

9 Claims, 9 Drawing Sheets

FUNCTIONAL BLOCK
DIAGRAM (SINGLE SENSOR)

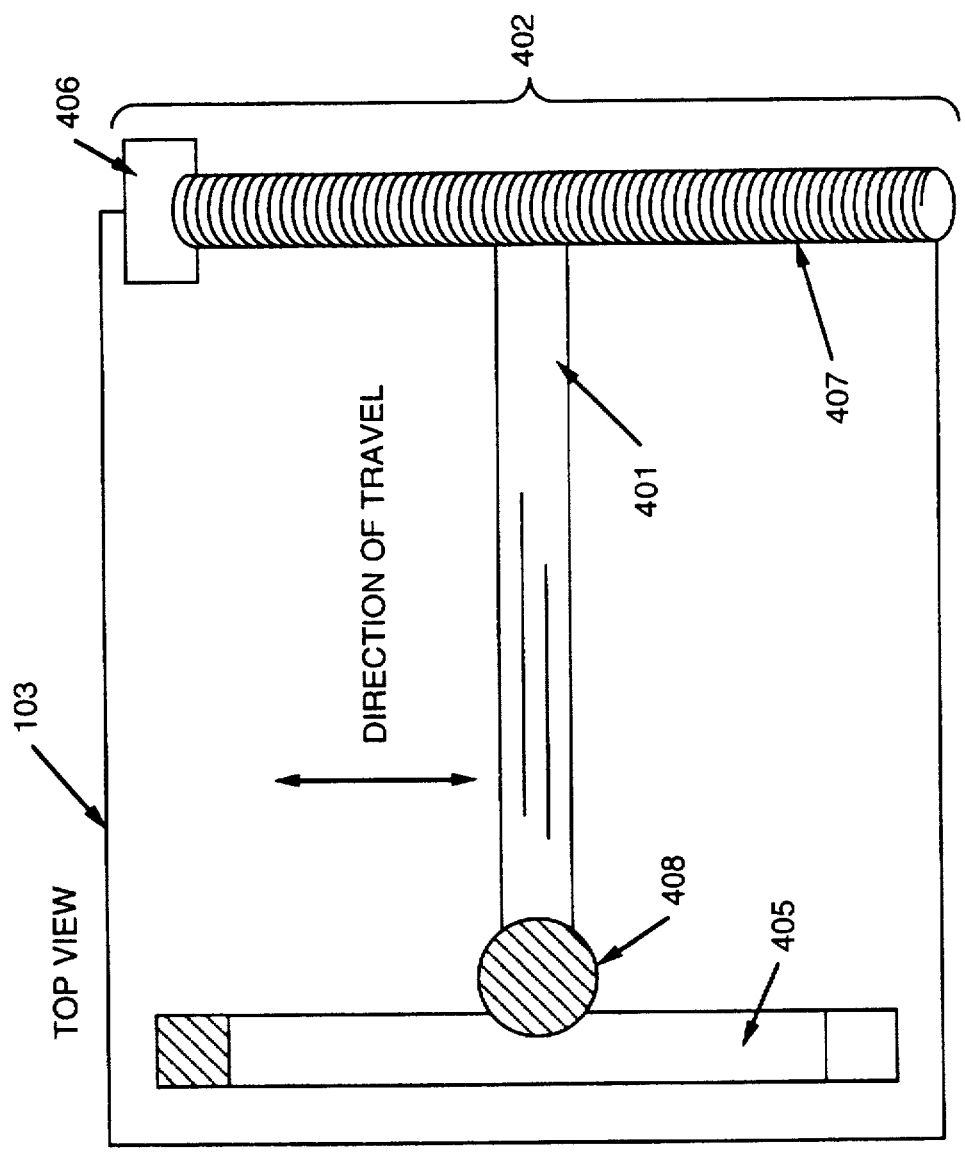
Figure 6A - TOP VIEW

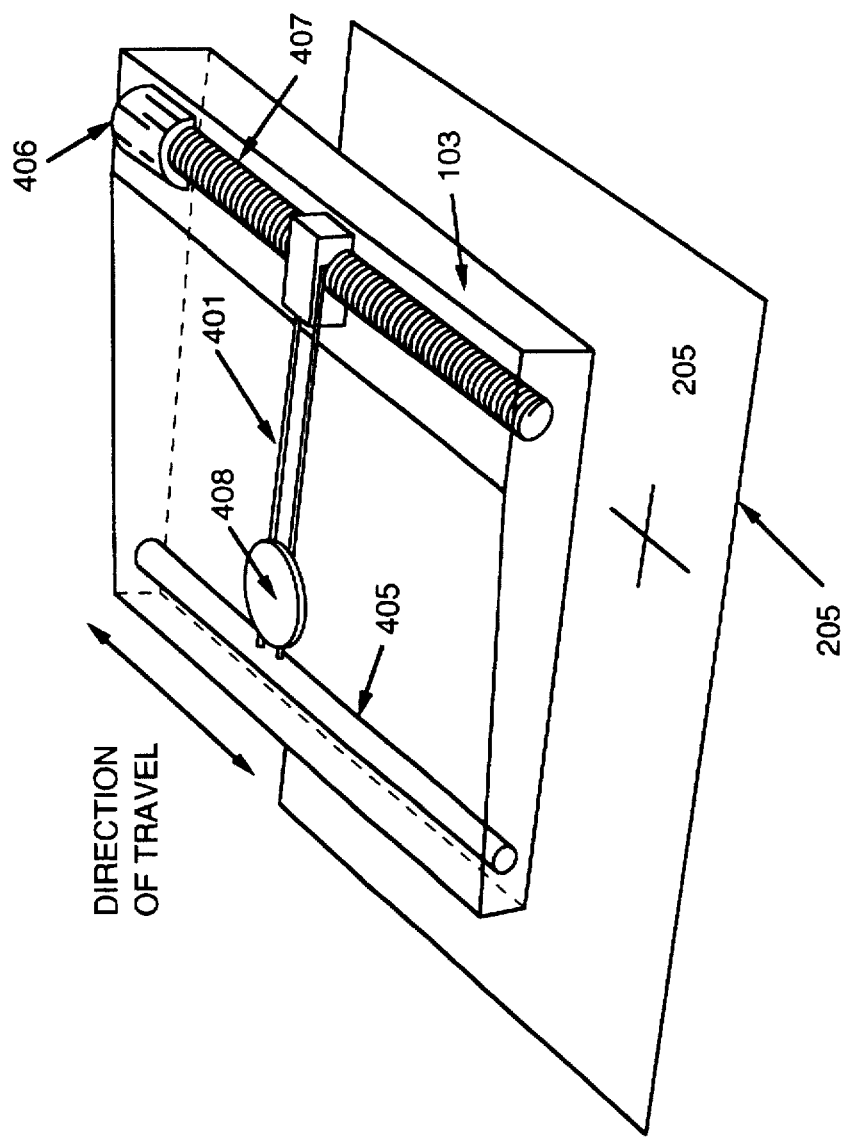
Figure 6B - SIDE VIEW

IMAGING APPARATUS FOR COPYING BOUND DOCUMENTS

BACKGROUND OF THE INVENTION

Many different methods of reproducing paper documents exist. These methods commonly employ photocopiers, optical scanners, facsimile machines or cameras to reproduce the image on one document onto another. Such equipment is currently designed optimally to reproduce single-page or multi-page documents introduced into the device as a stack of single pages. They typically use a flat-load technique where a single page is placed on a flat glass plate.

Prior art reproduction devices also use optical scanners and facsimile machines. A sheet of paper is drawn across a reading device composed of light-sensitive electronic sensors which convert the image to electronic data. The data can then be stored, transmitted to other devices or otherwise manipulated. In most cases the reader is fixed and the document is drawn across it. Alternatively, the reader may be moved over a fixed document.

These reproduction devices alternatively may copy the image using a video or digital camera. The document to be reproduced is placed on a surface and the imaging device captures the document on media such as celluloid, disk, electromagnetic or solid state image storage devices.

Existing reproduction devices are well suited to reproducing documents that can easily be placed on a flat surface. However, they are not readily adapted to duplicating documents that are not flat, such as bound books, magazines or similar collections.

The difficulty in copying single pages from a bound document arises because bound pages will not lie flat. Their pages are bound along one edge by glue or by sewing the pages together with a binding material. Consequently, the pages will not lie totally flat when the book is opened, but instead typically bend over a curve from the center of the spine to the open edge. When existing reproduction devices attempt to copy a bound page, the bend distorts a portion of any image or text on the portion of the page closest to the binding edge.

The bound nature of the collected documents requires repeated handling. The user must bring the bound document to the reproduction device, fully open the document, turn it upside down and press down strongly upon the spine to hold the document against the reproduction device's flat surface (typically glass) in an attempt to minimize distortion. Often a lid of the reproduction device must be placed over the bound document without diminishing the pressure against the document or allowing the document to shift location outside the area of usable image capture. The foregoing steps must be repeated for each page of the bound document to be copied. This reproduction method is unsatisfactory because the process of opening the lid, picking the bound document up off the flat surface, flipping a page, turning the document over and pressing it against the flat surface again is very tedious and time-consuming.

Furthermore, the foregoing steps may cause enormous damage to bound documents, especially older books found in the special collections of many libraries. The transportation of frail, antique books to the reproduction device by itself can cause damage. The pressure on the spine during copying causes substantial damage to the binding. Further, the intense light required by existing reproduction devices for accurate reproduction can fade the ink and discolor the pages. Ancient books can disintegrate during this process.

Prior art solutions to reproducing bound documents, especially books, address some of the problems associated with optical distortion or portability. Efforts to reduce optical distortion focus on creating an upright wedge-shape attached to the reproduction device on which to place the bound document. Once placed on top of the wedge, the page or pages are either reproduced by an electrostatic method or scanned by fixed fiber-optics or by an array of thin film transistors. These methods are described in U.S. Pat. Nos. 3,635,557, 3,630,612, 5,053,819, 5,072,252, 5,084,732, and 5,359,207, all of which are incorporated herein by reference. Although these prior art solutions may reduce the optical distortion, they suffer from other defects and do not adequately offer a portable, efficient method of document reproduction. The large size of the equipment, including the wedge shape, prohibits portability. The user must bring the document to the reproduction device rather than bringing the reproduction device to the document. Some prior art techniques use intense light that will damage bound documents. In addition, the bound document must be reopened and re-hung on the wedge for each page desired to be reproduced, a time-consuming process that also may cause damage.

Prior art solutions to reproducing bound documents also describe various types of portable devices. For example, some portable reproduction devices use hand-held scanners that either are physically dragged across a page by the user or are self-propelled across a page by a drive mechanism, as described in U.S. Pat. Nos. 4,922,111, 4,731,668, 5,381,020, 5,306,908, 5,166,812, 5,301,243, 4,989,237, 5,083,218, 5,018,026, 4,797,544, 4,793,812, and 4,652,937, incorporated herein by reference. However, all of these reproduction devices fail to delineate a fast, easy method of copying documents, as the existing scanners are only capable of reading a small portion of the text or image at any one time. This limitation forces the user to pick the scanning device up when it comes to the end of the text or image portion and reposition it at the beginning of the next text or image portion.

Other scanners use a "one-dimensional" bar, wide enough to scan an entire page on a single read, as described in U.S. Pat. Nos. 5,381,020, 5,306,908, and 4,989,237, incorporated herein by reference. Yet, this device still requires the user to drag the bar across the entire page.

All of the prior art scanning reproduction devices do not adequately protect bound documents, especially books, from damage. They require the user to open fully each book. Both the complete opening of the book and the running of the device across the page consume time and can cause damage to older books. Finally, the existing scanning devices do not adequately prevent a scanned image from being distorted when the area near the binding is scanned. Distortion of the image due to binding-dependent curvature is either not addressed by the prior art devices or is dealt with using fixed mounting frames or other similar techniques which suffer the same defects as photostatic reproduction.

For the foregoing reasons, there is a need for a better reproduction apparatus for copying bound documents such as books. The apparatus should provide a method of reproducing bound documents without optical distortion of the text or images near the binding. The device should also allow the reproduction without damaging the original documents including the binding, the pages or the ink. Finally, such an apparatus should be portable and able to copy bound documents stored in a confined area with a minimal amount of equipment.

SUMMARY OF THE INVENTION

The present invention is a portable reproduction apparatus capable of duplicating bound documents. The apparatus contains a frame or carriage, a light source to illuminate the image to be reproduced, a sensor and an input-output device for transferring data received by the sensor. The frame or carriage contains the above components and is configured for portability, whereby the apparatus is configured to be inserted into a bound document with minimal opening of the document and with minimal pressure on the binding of the document.

The present invention provides a solution to the optical distortion, damage and immobility problems of prior art devices. The apparatus is portable and scans documents by being inserted manually between the pages of bound documents. The bound documents are opened to the smallest extent possible. The apparatus may be entirely flat or slightly angled to provide space for electronics. A single page or two pages may be scanned at once, depending on whether the apparatus has one scanning surface or two opposed scanning surfaces. The invention facilitates document management, optical character recognition, computer graphics, electronic publishing and document duplication.

BRIEF DESCRIPTION OF THE DRAWINGS

The present invention will be better understood by reference to the accompanying drawings in which:

FIG. 6A is a top view of an embodiment of the present invention having a traveling sensor bar.

FIG. 6B is a side perspective view of the embodiment of the invention shown in FIG. 6A.

Description of the Preferred Embodiments

Figure 1:
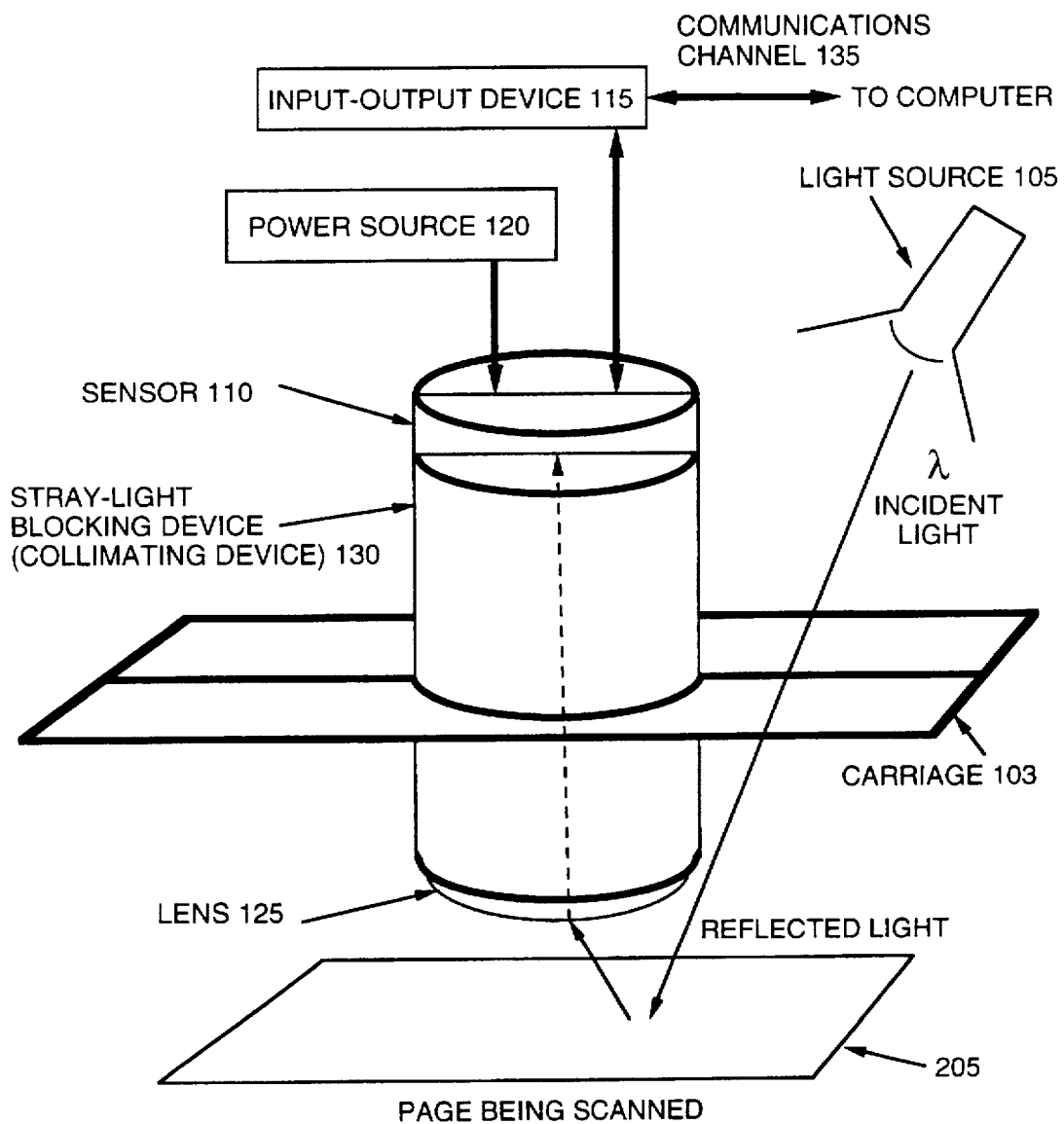
FIG. 1 is a block diagram of the system of the present invention.

As shown in FIG. 1, a preferred embodiment of the present invention includes a carriage 103, a light source 105, a sensor 110, an input/output device 115 and a power source 120. Depending on the particular item to be imaged, the invention may also include a lens 125 and a stray light blocking device 130. Sensor 110 and input/output device 115 are connected to external devices via communications channel 135. Communications channel 135 is capable of transferring data to and from attached devices, and may be wire, cable, conductive traces or other suitable connections.

Figure 2A:
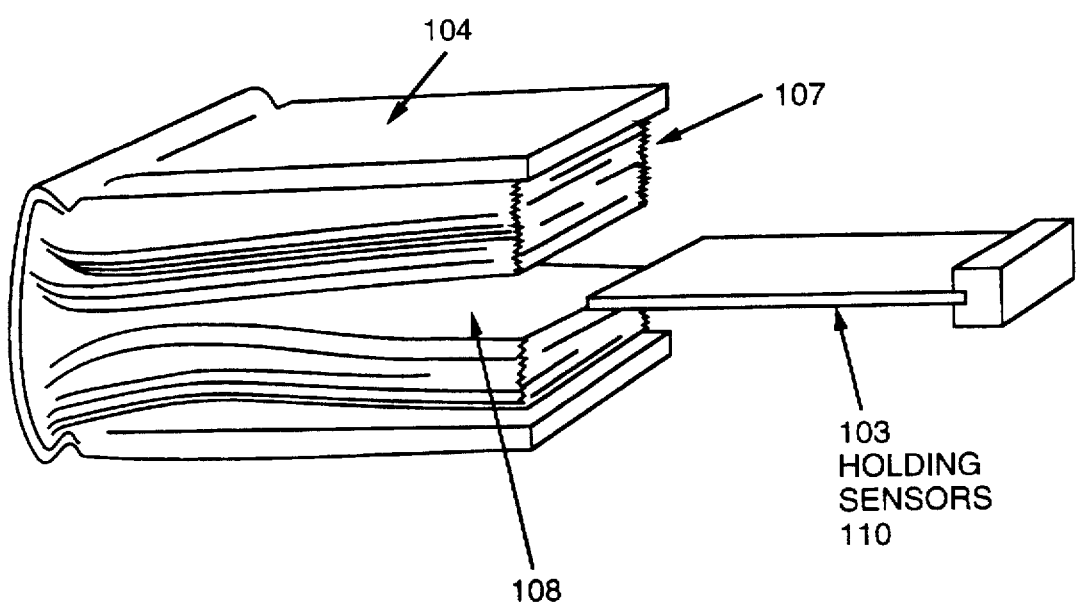
FIG. 2a depicts an embodiment of the present invention where the sensor is flat.

Referring to FIG. 2a, carriage 103 is a frame suitably sized and weighted to allow the image reproduction device easily to be hand-held by the user and readily inserted into bound documents (104) through a small opening (108). Carriage 103 is composed of a lightweight material such as aluminum, so that it is portable and may be carried by the user from one location to another. Carriage 103 is thin enough to allow it to be inserted between pages (107) of a bound document, yet thick enough to contain the necessary components to reproduce the image.

Figure 2B:
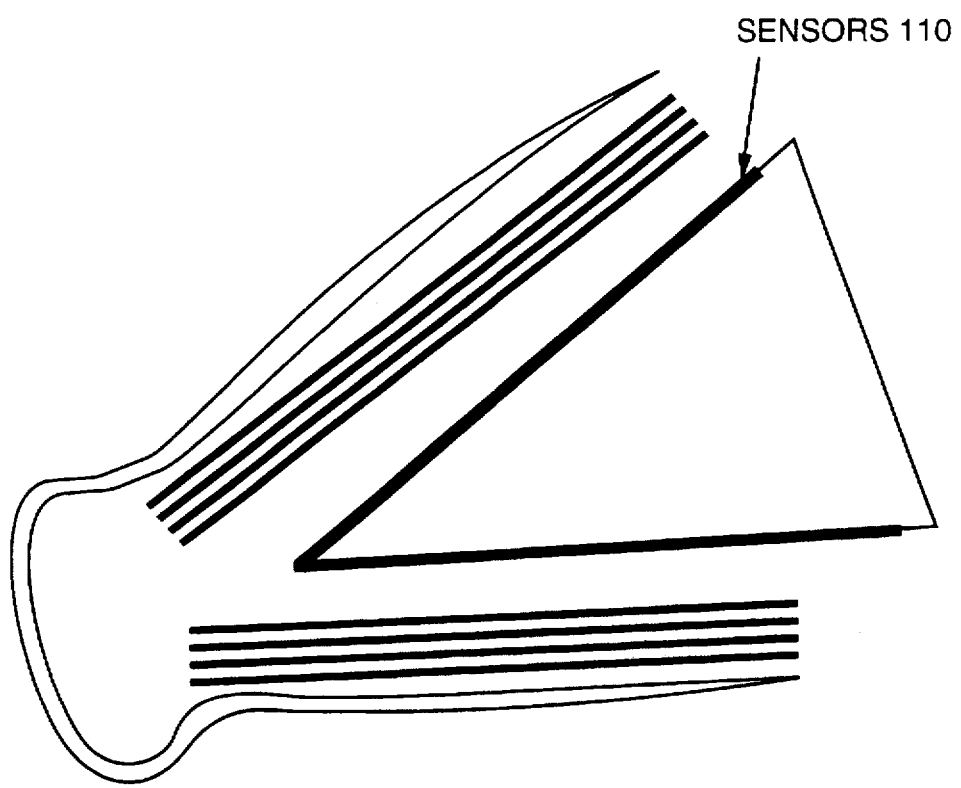
FIG. 2b depicts an embodiment of the present invention where the sensor is wedge-shaped.

FIG. 2b shows another embodiment of the invention which uses a wedge-shaped carriage 103. Other configurations of carriage 103 may be used which permit image reproduction while minimizing damage to the bound document.

Figure 3:
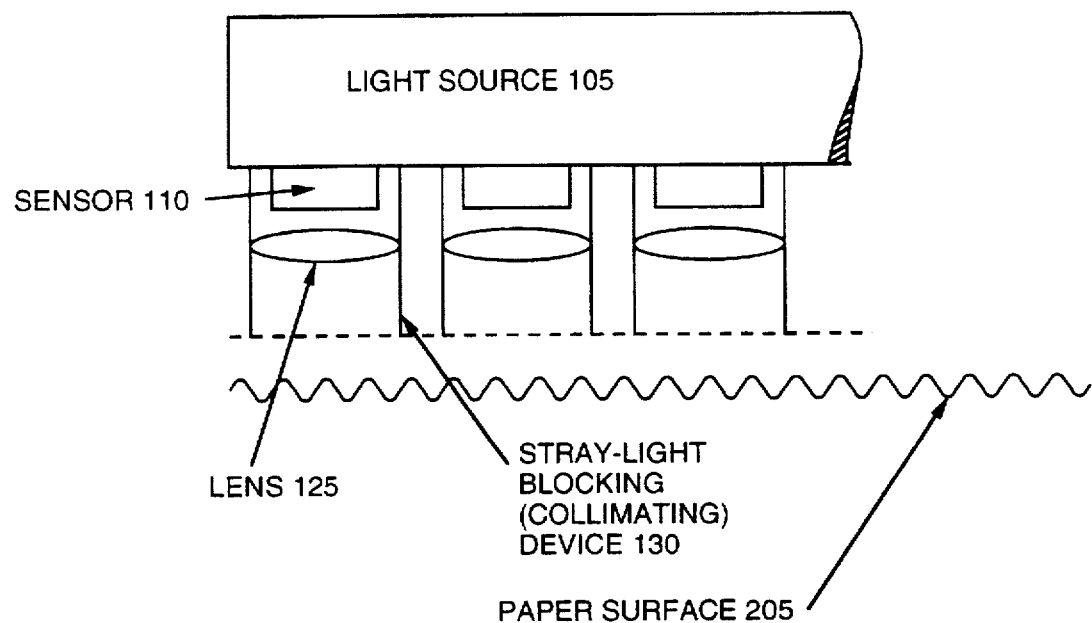
FIG. 3 illustrates a collimating device for the blocking of stray light of the present invention.

Referring to FIG. 3, light source 105 is designed to illuminate the area to be reproduced in as uniform a manner as possible. The emissions from light source 105 must be within the energy spectrum that can be efficiently detected by sensor 110. Preferably, light source 105 will emit light visible to the human eye because visible light is reflected strongly across the entire spectrum if the surface of the page is white, yet will reflect little or none of the incoming spectrum if the surface of the page is black or some other darker color.

Light source 105 can either be attached to or remain separate from the carriage. The path of light from light source 105 must be directed onto the paper surface 205 so that sufficient light is reflected to the area of sensor 110. Light from light source 105 should strike the paper surface 205 as close as possible to a perpendicular angle so as to minimize errors caused by specular reflections from surface artifacts on the page. However, light source 105 does not have to be positioned directly above or in front of the paper surface 205. Light source 105 can be positioned adjacent to or even behind sensor 110. Light source 105 may even be positioned behind the paper surface 205 as long as the area to be reproduced is sufficiently illuminated, the paper is sufficiently transparent, and there is no interfering image on the opposite side of the page.

Light source 105 may be an electroluminescent panel, a diffusing plate carrying light from a source connected to the sensor array but maintained outside the scanner itself, or other well-known light emitting or guiding devices, such as fiber optic devices.

Sensor 110 may be a Charge Coupled Device ("CCD"), an optical transistor or other solid state light sensing device capable of receiving incoming light reflected off of the area to be reproduced. Sensor 110 can either be an individual sensor or an array of CCDs or thin-film optical transistors, fabricated as is well known in the display art.

Sensor 110 can also be designed using optical fibers affixed to a sensor substrate so that incoming light reflected from the area being scanned is guided down the optical fiber to the sensor 110 located outside the physical location of the document being scanned. The ends of the optical fibers are held perpendicular to the surface of the page to be reproduced with the fibers bent to pass the light to sensor 110. Transmitting data to sensor 110 using optical fibers allows variations in the angle at which the bound documents are opened to reproduce a page. The angle depends entirely on the size, density and radius of curvature possible in the bent optical fibers.

Sensor 110 can be manufactured on a single semiconductor wafer, with interconnections made between any individual sensors and applicable circuitry by conductive traces created using semiconductor fabrication technology well known in the art.

Sensor 110 can also be composed of individual sensors placed on a transparent substrate using well established adhesive or other bonding and contact-point or other wiring techniques. By careful design and placement of the sensors using precision, automated assembly techniques, the individual sensors of sensor 110 can be manufactured using state-of-the-art, surface-mount assembly procedures and equipment.

A preferred embodiment of sensor 110 uses a CCD to receive incoming light. A CCD is a device in which individual semiconductor components are connected such that an electric charge output from one device acts as the input to the next device.

Referring to the block diagram of FIG. 1, sensor 110 also includes circuitry for controlling its operation and an interface that manipulates received data into a form that can be operated on by input/output device 115. Input/output device 115 converts control signals from a control source, such as a computer, into signals that control sensor 110, and it also receives data from sensor 110 and converts that data into a form that can be used by the computer.

The preferred method of data transfer to and from input/output device 115 is by a flexible multi-wire cable assembly making direct physical and electrical contact between a digital computer, network, or display (not shown) and sensor 110. However, data transfer by input/output device 115 can also take place by wireless data transmission technology, such as a data-modulated radio-frequency ("RF") transmission or an infrared ("IR") communications link. The RF or IR transmitter preferably is located on the carriage. If desired, the scanned data may be stored in a hard disk or memory module for later analysis. In particular, small, light memory storage modules such as mini-drives, PC cards or other devices adhering to PCMCIA standards may be used. The manner in which digital data from input/output device 115 is received, decoded and processed is not part of this invention and may use technologies well understood in the art.

The present invention also includes a power source 120 to provide electrical power. Power source 120 can be any device commonly used for handheld portable devices, including power cells such as alkaline or nickel or metal-hydride rechargeable batteries using an alternating current power supply as a battery charger. Alternatively, a remote power source derived from standard AC wiring may be supplied on a flexible cable to the sensor array.

Referring to FIG. 3, the present invention may also include a lens 125. Lens 125 is necessary any time the physical area of the image to be reproduced is greater than the physical area of sensor 110. Lens 125 directs or focuses the image reflected by light source 105 to sensor 110. Inclusion of a lens 125 assures the user that the entire image to be reproduced will be captured by sensor 110. Light reflected after light source 105 strikes the image will be directed to sensor 110 even if the areas of the image to be reproduced and sensor 110 are not equal.

Lens 125 is designed so that sensor 110 receives light from a portion of the image with minimal overlap between the regions of the image captured by sensor 110. Lens 125 can be any type of device capable of directing or focusing light waves. The physical placement of lens 125 may vary. Lens 125 may be a separate entity from sensor 110 or it may be incorporated as part of sensor 110. The only design constraint is that lens 110 be placed between the image to be reproduced and sensor 110.

The present invention may also include a stray light blocking device 130, for example, an opaque collimating device constructed from a metal or plastic tube or sheet. One embodiment of stray light blocking device 130 uses an array of separate tubes as collimating devices 207. These may be bonded together by glue or other adhesives or may be individual holes in a sheet of metal, plastic or other material, as is known to those skilled in the art. Stray light blocking device 130 may also comprise controllable LCD elements in a sheet array, with the direction of the LCD channels fixed at the optimum angle for illumination of a page. Stray light blocking device 130 helps keep the light emitted from light source 105 as well as reflected light from areas outside the area of the image to be reproduced from striking sensor 110. Stray light blocking device 130 can be used when sensor 110 is some distance away from the image to be reproduced. A stray light blocking device 130 will block the undesired reflected light rays, thereby assuring that only reflected light from the image to be reproduced strikes sensor 110.

Stray light blocking device 130 may not always be necessary. If the sensor 110 is physically close to the image to be reproduced, there will be less stray reflected light.

Light strikes paper surface 205 by passing around stray light blocking device 130. The emissions from light source 105 are reflected from paper surface 205 to return to sensors 110.

The interior and exterior surfaces of stray light blocking device 130, as well as its mounting structures and the entire empty volume surrounding the device should be treated or colored to reduce or eliminate stray light reflection. This treatment varies depending on the requirements of the device and the accuracy required by the user, and may be a simple coating of flat black paint, a black anodizing treatment or the application of an optical-quality, anti-reflection coating of the type well known in the art. The surface treatment for the suppression of stray reflections may be applied during the fabrication process or at any subsequent time, and it may comprise immersion in a chemical bath, plasma etching, electrostatic painting or other such uniform coating techniques.

Referring to FIG. 2a, the operation of the present invention begins by placing the bound document 104 to be copied on the working surface with the edges of the page 107 exposed. The document is opened as small an amount as possible at opening 108 so that the outside end of the page desired to be copied is separated from its opposing page. The user next inserts carriage 103 between the opened pages. Once inserted, carriage 103 requires no movement by the user for it to function.

Referring now to FIGS. 1, 2a and 3, the user initiates power to the invention by turning on power source 120. Light source 105 emits incident light which strikes the paper surface 205. Light is reflected off the surface and becomes reflected light incoming to the sensor. Incoming reflected light returns from the image to be reproduced, passes through stray light blocking device 130 and lens 125, and strikes sensors 110. Sensors 110 detect the incoming light and convert it into an electrical signal. Sensors 110 transmit the electrical signal via input/output device 115.

After this operation, the user removes carriage 103 from the bound document 104. To image an additional page, whether the next sequential page in the bound document or another page elsewhere in the document, the user need not remove the document from the work surface. Instead, the user only has to select the next page and insert carriage 103. Because the bound document itself does not need to be picked up or moved in this process because only a single page is moved, the bound document is protected against mechanical damage. Further, the configuration of sensor 110 along with carriage 103 ensures that only infinitesimal pressure is applied to the bound document or its binding. Moreover, the compact nature of the device of the invention allows it readily to be transported within a library, an office or between locations.

The type of data collected by the sensor 110 depends upon the configuration of sensor 110 and the system architecture.

In one embodiment, the data is taken at the same instant over the entire surface of the array. In other embodiments, the data may be taken at different times and then re-integrated into a comprehensive picture of the data over the entire area. Because the data on pages of a bound document are fixed, there is no problem in taking multiple samples of data in different locations or pages at different times and then re-integrating them into a complete reproduction.

The performance of sensor 110 depends primarily on the quality of the materials to be imaged and the underlying capabilities of the sensor 110 and light source 105. For a clean white page which is printed cleanly in solid dark ink, the dynamic range of the optical signal detected by sensor 110 is very large and the optical noise introduced by light leakage from the light source 105 is of less importance. Where the text or image is lightly printed, faded, discolored or dirty, the optical signal may be considered to be "noisy", and there is less usable dynamic range of optical signal to work with. In this case it is necessary that the entire dynamic range of the optical signal be preserved during the conversion into an electrical signal by sensor 110. Thus it becomes more important that stray light from the light source 105 or from adjacent regions of the page be eliminated by stray light blocking device 130.

In the simplest version of the invention, the image is captured directly as a bit-map pattern of digital ones and zeroes. The amount of light reflected from the page at any particular pixel position is either below a defined threshold and read as a digital zero, or at or above that threshold and read as a digital one. This operation results in a monochrome image which is nominally similar to the original printed values of text or graphics.

For a monochrome system, the threshold data bits can be stored as individual binary storage elements and then read out in the same way as data stored in a computer memory. For example, the sensor elements may be connected in horizontal and vertical arrays with their data output lines multiplexed on an internal data bus connected to input/output device 115. The data from the array is transmitted to a digital computer, network or display.

It is often important to retain gray-scale or color information from the page being scanned. For a gray-scale system, the operation must be enhanced because the data stored by the sensor must include analog information representing the received light's amplitude. Sensor 110 must be operated to manipulate analog data and convert it to digital data representing the analog values.

Using CCD elements for sensor 110, the gray scale information is generated by impinging incoming light on the CCD element. The light is absorbed and the CCD generates electrons. The quantity of electrons generated, and thus the amount of electric charge, is proportional to the amplitude to the incoming light. Light reflected from a white surface therefore will generate a greater charge than light reflected from a black surface. Gray scale data is generated in the form of a variable amount of stored electrical charge which accumulates in potential wells in the CCDS.

An individual CCD element can supply charge to an output port which carries a current proportional to the charge. This current, or a voltage developed from it in accordance with Ohm's law, can be measured directly or converted by an analog-to-digital converter, and its numerical value stored or transferred to another location. In the case of a CCD array, the charge-coupling principle allows the analog charge to be transferred across the array in a time-serial fashion similar to a digital shift register. In this way the data can be entered into the entire CCD array at one instant (as the image is taken of the incoming light pattern reflected from the page being scanned) and then read out and converted, one analog sample at a time, into digital data. The resulting digital data sample values can be processed as desired as a digital image representation of the scanned page.

Figure 4:
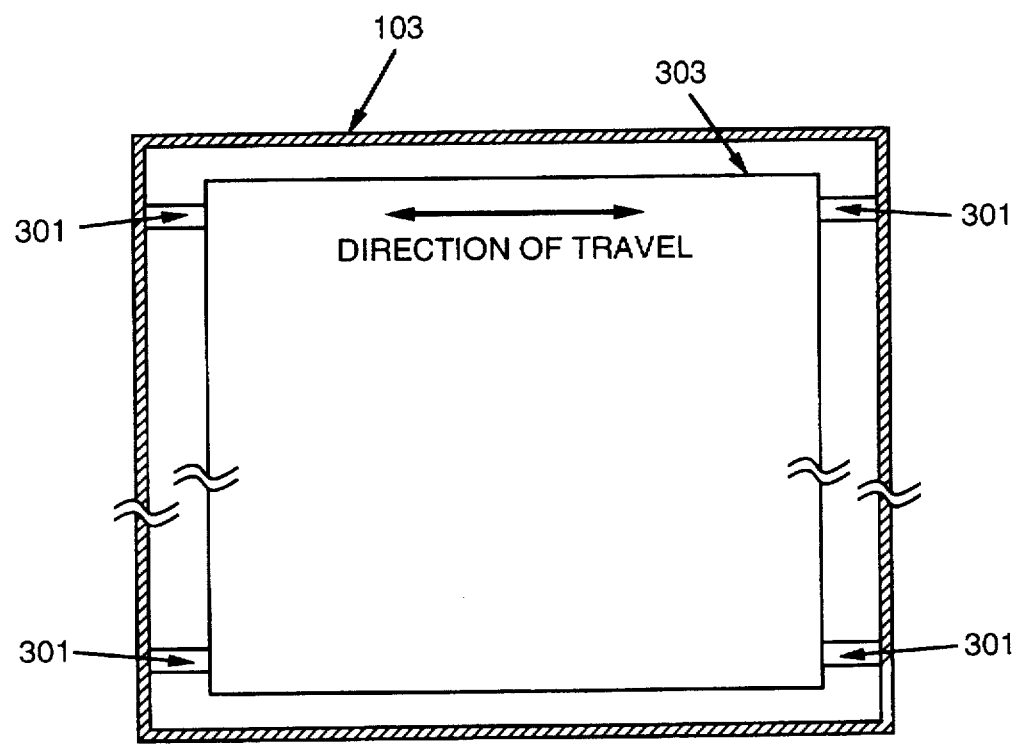
FIG. 4 is a top view of a sensor array panel of a preferred embodiment of the present invention using positioners.
Figure 5:
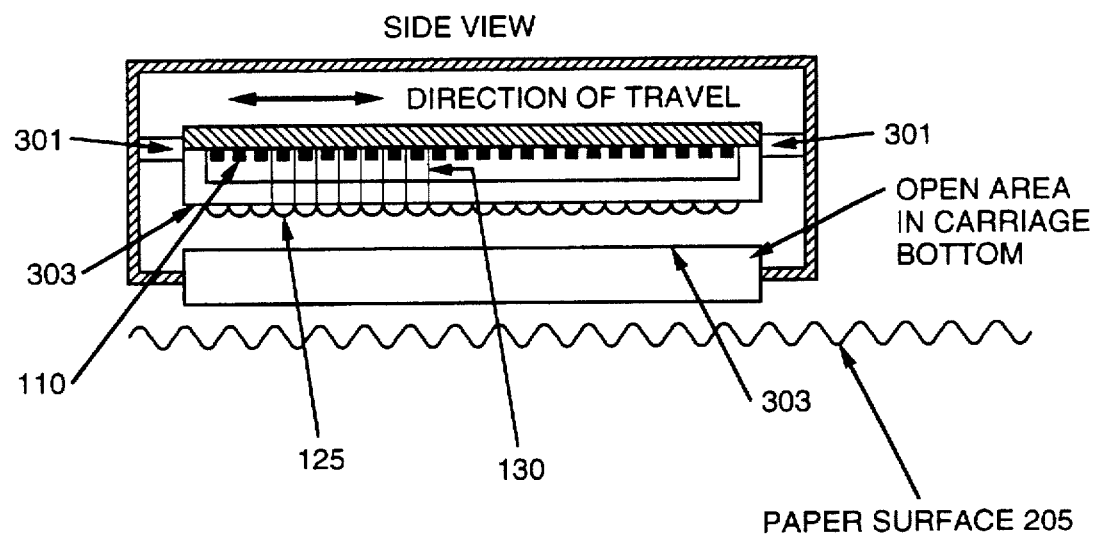
FIG. 5 is a side view of a preferred embodiment of the present invention using a sensor array panel.

If sensor 110 is composed of an array of smaller sensor subarrays, each subarray may operate to convert data particular to that subarray from analog form to digital form. The resulting digital data is then applied to a data bus in a manner similar to that of the monochrome sensor array described above. Other methods of converting and manipulating analog data derived from sensor subarrays to digital data are well known in the art.

Where it is difficult to cover the entire page at one time with the available sensors 110, sensors 110 and stray light blocking device 130 can be microstepped for improved coverage at the cost of some mechanical complexity and increased exposure time. Referring now to FIGS. 4 and 5, positioners 301 can microstep a sensor array 303, utilizing at least one sensor 110 (and, if appropriate, lens 125 and stray light blocking device 130) within the area of carriage 103. This can be accomplished by using a piezoelectric transducer, solenoid, or other type of positioner 301 to shift the position of sensor array 303 within carriage 103 by a distance dependent upon the resolution desired and the system architecture. This approach obviates the need to drag carriage 103 against the surface to be imaged, thereby reducing imaging distortion, mechanical stress and damage to possibly brittle documents.

Figure 7:
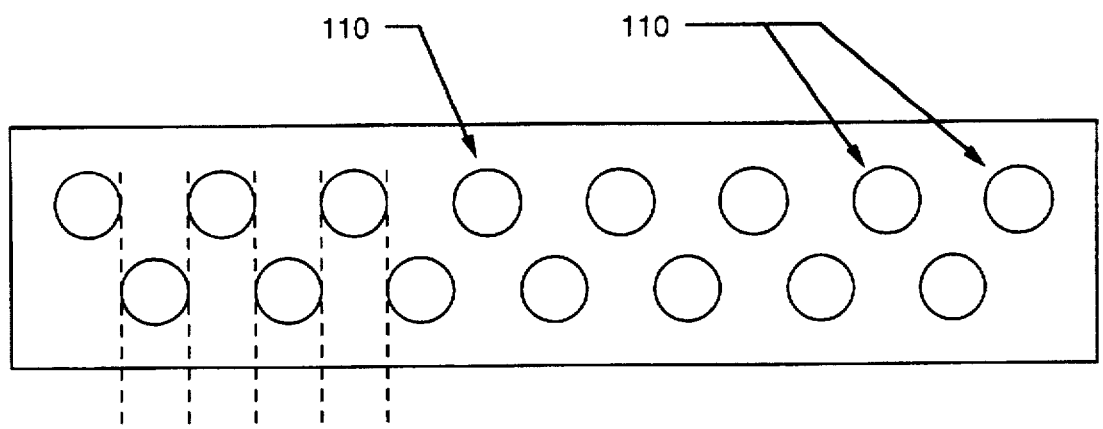
FIG. 7 is a top view of a staggered row of sensors used in one embodiment of the invention.

Referring now to FIGS. 6 and 7, the sensor array and positioners can be replaced with a sensor bar 401 which travels within carriage 103 over a page of a book. FIG. 6 depicts sensor bar 401 composed of an array of sensors extending over the entire width (or length, depending on orientation) of the document. Sensor bar 401 is driven across the length or width of the document by a driving mechanism 402, which can consist of any appropriate combination of motion source and guidance elements, such as an electric motor 406 and gearing and worm screw 407. Sensor bar 401 outputs a succession of linear samples similar to a raster-scan imaging of a document.

Sensor bar 401 is shown supported at one end by drive mechanism 402 and at its other end by rail 405 and idler wheel 407. Other mechanical arrangements are also possible, such as one in which sensor bar 401 is driven by drive mechanism 402 at both ends of sensor bar 401. In another possible arrangement, drive mechanism 402 can be positioned in the middle of sensor bar 401 with idler wheel 408 and rail 405 positioned at either end of sensor bar 401, and with drive mechanism 402 positioned such that it does not block illumination or reflected image light. In another approach, the sensor bar may be mounted in chains or belts at one or both ends, the chains or belts driven singly or in tandem by gears. In this case there may be one or more guide rails near the drive chains or belts, or in the interior area of the sensor bar.

The guide bars or idler/rail combination should be made of a self-lubricating or low-friction material such as a PTFE plastic. Fluid-based lubricants are likely to cause problems by coating optical surfaces and thereby reducing signal-to-noise ratio, if not blocking light transmission completely. The mechanical design considerations of the motor, worm screw, drive belts and/or chains, guide rails and idler wheels are well known to those skilled in the art of precision mechanical design.

The driving motor may be a low-voltage stepping motor or other design optimized for accuracy and speed. Speed and position errors can be reduced if a position-monitoring track is built into the transport mechanism, so that the current position of the sensor bar can be fed back to the electronic circuitry driving the motor and used to generate a correction factor that will cause the motor to step more accurately to its intended destination.

In all of these designs it is clear that light will hit the page from either side of sensor bar 401, thus providing a simpler means of illumination.

The sensors in sensor bar 401 need not be microstepped in the Y-direction because they travel in that direction as sensor bar 401 travels across the page. The sensors can be mounted on sensor bar 401 with no space between them, obviating the need for microstepping in the X-direction.

Depending on the design of the sensors or sensor subarrays, more or less area of the sensor bar may be occupied by interconnections and thus unavailable for optical sensor elements. Referring to FIGS. 6 and 7, sensor 110 can be mounted in staggered double rows so that no part of the page is missed. As sensor bar 401 moves in the Y-direction, one row of sensors 110 and, subsequently, a second row of sensors 110 travel over the paper. The second row of sensors 110 sense the region not covered by the first row. By staggering the rows in the X-direction in this manner, the rows of sensors 110 are able to scan the entire page without being positioned tightly next to each other. The collection of data from each row is synchronized with the motion of the sensor bar to accommodate the complete imaging of the area to be reproduced, as each row can provide only half the pixel data for each raster scan line. Each raster scan line is scanned twice; the resulting scan data is then combined to provide full pixel data for each line.

The present invention may also be configured for fullcolor reproduction. Color reproduction uses selected devices to filter the source light or the reflected light impinging on the sensor to permit individual spectral components of the page to be imaged individually. The most common method utilizes red, blue, and green filters, as is well known in the art. If sensors 110 are configured as a sensor bar, filtering can be accomplished by use of three color filters selectively affixed to the front of the sensors. In this configuration the sensor bar makes three successive image scans with the filters being changed between successive image scans. One embodiment of such a system uses three flat linear filters kept in a docking mechanism at one end of the sensor bar's travel, arranged such that, as the sensor reaches the end of its image scan, the current filter is put away into the dock and the next filter selected mechanically and mounted for the next successive image scan.

The sensor bar can be expanded to comprise three separate rows of sensors 110, with color filters (red, blue, and green) permanently affixed to the sensor 110 in each of the three rows. In this case, as the sensor bar image scans, the sensor bars pick up three different sets of raster images, corresponding to the spectral content of the image in each of the color regimes. This data can be sent to a digital computer and easily converted back to a full-color image of the original page.

In addition, an area array can be used for color imaging. In this configuration three sensors 110 can be used for each pixel, with the three sensors individually filtered to be sensitive to red, blue, or green. Alternatively, a color filter may be placed over the entire area array or the light sources themselves may be filtered.

In the case of color imaging, it is necessary to calibrate properly each color and each sensor for the light source used and for the individual filters. This can be done by adjusting the illumination source (for example, by adjusting the supply voltage so that the effective "color temperature" changes) and by weighing the received data in the digital computer used for data analysis. For example, the relative sensitivity of the sensor 110 may be calibrated to known printed colors with defined spectral attributes; this calibration information can then be used as a multiplier (or polynomial, for nonlinear systems) correction factor on the detected signal.

As will be understood by those skilled in the art, many changes in the apparatus and methods described above may be made by the skilled practitioner without departing from the spirit and scope of the invention, which should be limited only as set forth in the claims which follow.

I claim:

1. A portable reproduction apparatus for duplicating bound documents, comprising:

a light source to illuminate an image to be reproduced;

a sensor configured to cover only a portion of the image to be reproduced;

an input-output device for transferring data received by the sensor; and a carriage containing the sensor and the input-output device, wherein the carriage is configured to be inserted into a bound document with minimal opening of the bound document and minimal pressure on the binding of the bound document and the sensor is configured to traverse within the carriage across the entire image to be reproduced.

2. The apparatus of claim 1 further comprising a lens positioned to focus the image to be reproduced at the sensor.

3. The apparatus of claim 1 further comprising a stray light blocking device positioned to eliminate stray light from striking the sensor.

4. The apparatus of claim 1 wherein said carriage is configured substantially flat.

5. The apparatus of claim 1 wherein the sensors are configured on the carriage on two opposed surfaces.

6. The apparatus of claim 1 wherein the sensor is an array of individual sensors coupled to the carriage, and wherein the sensor is advanced across the image to be reproduced.

7. The apparatus of claim 1 wherein the sensor is configured in a linear array of elements on a sensor bar.

8. The apparatus of claim 7 wherein the sensor is driven within the carriage using a linear drive mechanism.

9. A portable reproduction apparatus for duplicating bound documents, comprising:

a light source to illuminate an image to be reproduced;

a sensor;

an input-output device for transferring data received by the sensor;

a stray light-blocking device including a plurality of opaque tubes positioned to eliminate stray light from areas outside the image from striking the sensor; and a carriage containing the sensor and the input-output device, the carriage configured to be inserted into a bound document with minimal opening of the bound document and minimal pressure on the binding of the bound document.

* * * * *